US008086680B2

(12) United States Patent
Boutboul et al.

(10) Patent No.: US 8,086,680 B2
(45) Date of Patent: Dec. 27, 2011

(54) COMMUNITY-DEFINED AND MANAGED COMMUNICATION NETWORK

(75) Inventors: Irwin Boutboul, Jersey City, NJ (US); Albert Delucca, Wantagh, NY (US); Jean-David C. Gibrat, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 12/271,001

(22) Filed: Nov. 14, 2008

(65) Prior Publication Data
US 2010/0125611 A1    May 20, 2010

(51) Int. Cl.
*G06F 15/16* (2006.01)
(52) U.S. Cl. ........ 709/206; 709/207; 709/217; 709/218; 709/205
(58) Field of Classification Search ............ 709/22, 709/206, 203, 207, 217, 218, 205
See application file for complete search history.

(56) References Cited

U.S. PATENT DOCUMENTS

| | | | |
|---|---|---|---|
| 7,069,308 B2 | 6/2006 | Abrams | |
| 7,844,671 B1 | 11/2010 | Lawler et al. | |
| 2006/0042483 A1 | 3/2006 | Work et al. | |
| 2006/0282303 A1 | 12/2006 | Hale et al. | |
| 2007/0103296 A1 | 5/2007 | Paessel et al. | |
| 2007/0250483 A1 | 10/2007 | Blue et al. | |
| 2007/0271272 A1 | 11/2007 | McGuire et al. | |
| 2007/0282877 A1* | 12/2007 | Fischer et al. | 707/101 |
| 2007/0288602 A1 | 12/2007 | Sundaresan | |
| 2008/0077595 A1 | 3/2008 | Leebow | |
| 2008/0222308 A1 | 9/2008 | Abhyanker | |
| 2009/0037470 A1* | 2/2009 | Schmidt | 707/104.1 |
| 2009/0222522 A1* | 9/2009 | Heaney | 709/206 |
| 2009/0319288 A1* | 12/2009 | Slaney et al. | 705/1 |
| 2010/0011081 A1* | 1/2010 | Crowley et al. | 709/206 |
| 2010/0180029 A1* | 7/2010 | Fourman | 709/225 |

OTHER PUBLICATIONS

Jordi Sabater, et al., Reputation and Social Network Analysis in Multi-Agent Systems, AAMAS'02, Jul. 15-19, 2002, Bologna, Italy, Copyright 2002, 8 pages.
U.S. Appl. No. 12/271,025, filed Nov. 14, 2008.
Notice of Allowance for U.S. Appl. No. 12/271,025 mailed Jun. 28, 2011.

* cited by examiner

*Primary Examiner* — Djenane Bayard
(74) *Attorney, Agent, or Firm* — Cantor Colburn LLP; Derek Jennings (57) ABSTRACT

A community-defined and managed communication network is provided. The community-defined and managed network includes creating a profile for a user of the network that includes a user-selected attribute and identifying a relationship between the attribute in the profile and data external to the profile. The identification includes analyzing user community-generated descriptors of the attribute and searching the external data for common descriptors. The community-defined and managed network further includes initiating an activity responsive to the analysis, which includes one or more of: prompting the user to invite a second user who is not a registered member of the communication network to join the communication network; prompting a third user to evaluate the user with respect to the attribute; and prompting the user to initiate a communication with a fourth user who is a registered member of the communication network.

24 Claims, 3 Drawing Sheets

FIG. 2

PROFILE FOR:
JOHN SMITH

SUGGEST AN ATTRIBUTE:

NAME: [____▽] — 304

TYPE: | TECHNOLOGY |
| BUSINESS |
| PROFESSIONAL |
| SOCIAL |
| GOAL-ORIENTED |
| OTHER |

308

302 — EXISTING ATTRIBUTES
FRENCH
SPEAKER
WRITER
BAKER
SKIING
FATHER
...

HOME
FIND/ADD SKILLS
MY PROFILE

DESCRIPTION:
[__________] — 306

304 — EXISTING SUGGESTIONS:
PAINTER        SIGNUP — 314
TRAVELER     SIGNUP
MUSIC           SIGN UP

ADD ATTRIBUTE TO MY — 312
PROFILE WHEN AVAILABLE:

☐ YES
☐ NO

DISPLAY ATTRIBUTE TO — 316
COMMUNITY:

☐ YES
☐ NO

MY PROFICIENCY: [ 3 (AVERAGE) ▽] — 318

☐ INVITE COMMUNITY? — 310

FIND: ○ EXPERT — 320
         ○ ATTRIBUTE — 322
[__________] — 324
[ GO ]

[ SUGGEST ]  [ CANCEL ]

COMMUNITY-DEFINED AND MANAGED COMMUNICATION NETWORK

CROSS REFERENCE TO RELATED APPLICATIONS

This application is related to co-pending application U.S. application Ser. No. 12/271,025 filed Nov. 14, 2008, the contents of which are incorporated by reference herein in their entirety.

BACKGROUND

The present invention relates to communication networking, and more specifically, to a method, system, and computer program product for providing community-defined and managed communication networking services.

Networking sites such as Facebook®, LinkedIn®, and Match.com® provide the ability for individuals to associate and/or collaborate with other individuals over a network. These, and other, networking sites typically target a community of users who share some common purpose (e.g., business/professional, social, goal-oriented—such as eDiets.com®, etc.). In particular, networking sites commonly target a limited population and require users to define themselves through a restricted and pre-disposed set of attributes using a pre-defined profile template. For example, Facebook® is primarily targeted to a young, college-aged market. This is evident when considering the profile templates provided for users who wish to register for the site. In particular, the template profile contains pre-defined attribute fields, which prompt each newly registered user to identify a school in which the user is currently, or was previously, affiliated. Registered users can then search for, and interact with, other students who may attend the same school or who are living in the same geographic area of the school. While these profiles do not limit users' interactions to others who attend the same school, there is clearly a significant focus on establishing a community of college-aged students for the purpose of social networking (e.g., other pre-defined attributes that exemplify the interests of young, college-aged students include information, such as age, music preferences, nightlife, etc.). Accordingly, the profile template provided by the site is designed to cater to this demographic. Likewise, a professional networking site may establish a profile template that prompts a user to enter job-oriented information, such as employer, career type, professional affiliations, and acquired skills. Interactions among users of the professional networking site are typically (and primarily) business-oriented, as compared to the personal, or social interactions of a social networking site.

One of the drawbacks to these existing networking sites is that a user may be required to register for, and maintain, multiple different profiles, each of which satisfy the needs of the user with respect to the specific purpose or objectives of each of the individual sites. Maintaining multiple profiles can be a time-consuming effort for the user, since the user would need to maintain separate user accounts/password information for each site, as well as update information for each site as the situation warrants.

What is needed, therefore, is an extended networking system that enables users to define themselves and their community of users, such that a single profile can be implemented and maintained by each user for the purpose of serving any type of objective (e.g., personal, social, professional, goal-oriented, etc.), and whereby the community of users maintains control of the management of the extended network.

SUMMARY

According to one embodiment of the present invention, a method for implementing a community-defined and managed communication network is provided. The method includes creating a profile for a user of the network that includes a user-selected attribute. The method also includes identifying a relationship between the attribute in the profile and data external to the profile. The identification includes analyzing user-community-generated descriptors of the attribute and searching the external data for common descriptors. The method further includes initiating an activity responsive to the analysis, which includes one or more of: prompting the user to invite a second user who is not a registered member of the communication network to join the communication network; prompting a third user to evaluate the user with respect to the attribute; and prompting the user to initiate a communication with a fourth user who is a registered member of the communication network.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

DETAILED DESCRIPTION

Exemplary embodiments of the invention provide an extended communication networking system and services that enable users to define themselves and their community of users, such that a single profile can be implemented and maintained by each user for the purpose of serving any type of objective (e.g., personal, social, professional, goal-oriented, etc.), and the community of users maintains control of the management of the extended network.

The extended communication networking system (also referred to herein as "communication networking system") allows each user to define him- or herself through an unlimited combination of self-created attributes. The communication networking system provides efficient identification of its users in order to enable and stimulate their interactions. The system is self-evolving and is capable of targeting a much larger population than its' counterparts, as it is not restricted to any specific objective.

Figure 1:
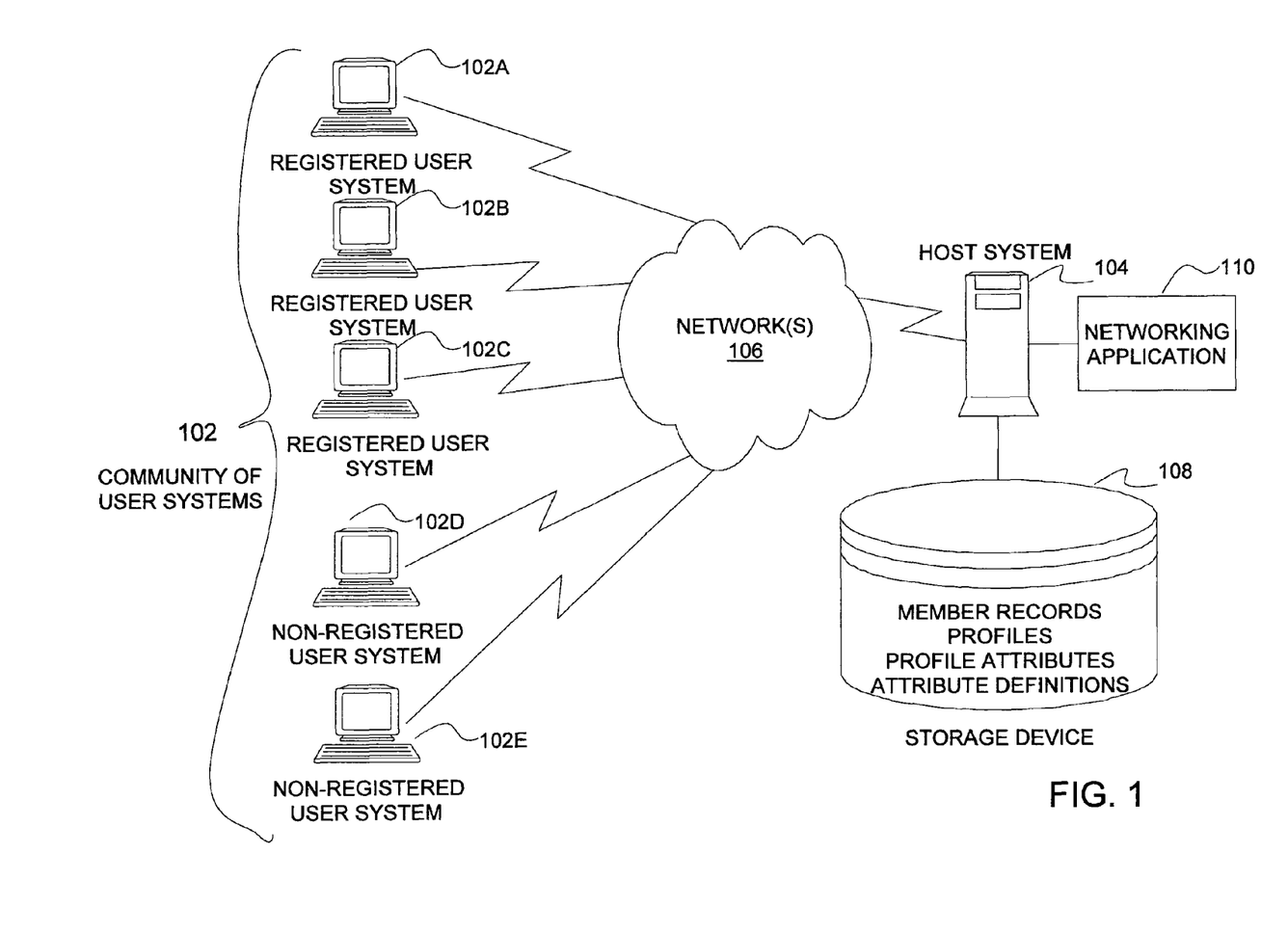
FIG. 1 depicts a block diagram of a system upon which communication networking services may be implemented in an exemplary embodiment.

With reference now to FIG. 1, an exemplary system upon which the communication networking services may be implemented will now be described. The system of FIG. 1 includes a community of user systems 102 in communication with a host system 104 over one or more networks 106. The host system 104 executes computer instructions for performing the communication network services described herein. The host system 104 is also communicatively coupled to a storage device 108.

The user systems 102 each represent computer processing devices through which users at one or more geographic locations may contact the host system 104. As shown in FIG. 1, the user systems 102 may be coupled to the host system 104 via network(s) 106. Each user system 102 may be implemented using a general-purpose computer executing a computer program for carrying out the processes described herein. The user systems 102 may be personal computers (e.g., a lap top, a personal digital assistant) or host attached terminals. If the user systems 102 are personal computers, the processing described herein may be shared by a user system 102 and the host system 104 (e.g., by providing an applet to the user system 102).

The network(s) 106 may be any type of known networks including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion. In one embodiment, the network is an intranet and one or more user systems 102 execute a user interface application (e.g., a web browser) to contact the host system 104 through the network 106. In another exemplary embodiment, one or more of the user systems 102 is connected directly (i.e., not through the network 106) to the host system 104 and the host system 104 is connected directly to or contains the storage device 108.

The storage device 108 includes a data repository with data relating to managing the communication network services and may be implemented using a variety of devices for storing electronic information. It is understood that the storage device 108 may be implemented using memory contained in the host system 104 or that it may be a separate physical device (e.g., as shown in FIG. 1). The storage device 108 is logically addressable as a consolidated data source across a distributed environment that includes network(s) 106. Information stored in the storage device 108 may be retrieved and manipulated via the host system 104 and/or via the user systems 102. The data repository includes one or more databases containing documents, files, and related data in support of the communication networking services. In an exemplary embodiment, the storage device 108 stores member records, user profile records, profile attribute records, and attribute definitions. The member records may include, e.g., personal/identification information related to a registered member of the communication networking services. The member records may be used to identify each of its members, e.g., via the user's email address or other identifying information. In an exemplary embodiment, the user profile records store user-defined and/or community-defined/refined attribute information, user and/or community defined/refined values associated with the user-provided attributes, and other information, as will be described further herein. In an exemplary embodiment, the profile attributes are stored in searchable profile attribute files and include user-defined and community-refined attributes that describe characteristics of the individual users in the community. The community-refined attributes include descriptors that are attributed by community members to further define the attributes. For example, suppose a user enters the attribute, "father," to define himself The community of users may further refine this attribute by attaching descriptors, such as "man," "gentleman," "husband," "son," or other related terms. These attributes, and their descriptors, are stored in the profile attribute records in the storage device 108 and are described further herein.

The host system 104 depicted in FIG. 1 may be implemented using one or more servers operating in response to a computer program stored in a storage medium accessible by the server. The host system 104 may operate as a network server (e.g., a web server) to communicate with the user systems 102. The host system 104 handles sending and receiving information to and from the user systems 102 and can perform associated tasks.

The host system 104 may also operate as an application server. The host system 104 executes one or more computer programs to provide the communication networking services. As shown in FIG. 1, the host system 104 executes a networking application 110 for implementing the communication networking services described herein. The application 110 also includes a messaging component for facilitating communications among users of the services. Processing may be shared by the user systems 102 and the host system 104 by providing an application (e.g., java applet) to the user systems 102. Alternatively, the user systems 102 can include stand-alone software applications for performing a portion or all of the processing described herein. As previously described, it is understood that separate servers may be utilized to implement the network server functions and the application server functions. Alternatively, the network server and the application server may be implemented by a single server executing computer programs to perform the requisite functions.

As shown in FIG. 1, the user systems 102 collectively form a community of users of the communication networking services. User systems 102A-102C represent users who are registered members of the communication networking services (e.g., each of the users has registered with the host system 104 and a corresponding member record and user profile exists in the storage device 108). User systems 102D and 102E represent users who are not registered members of the communication networking services but who may communicate with registered and non-registered users, although these users may be provided with restricted access to the services or may be allowed limited functions.

In an exemplary embodiment, the networking application 110 provides a user interface that enables registered users to define themselves via a user profile without restriction. Once a community of registered users is in place, the networking application 110 works autonomously to provide additional functionality. For example, the application 110 can process communications conducted by users, registered or not, e.g., using natural language processing, to identify relationships among the users and take various actions accordingly. These features will now be described with reference to FIGS. 2-4.

Figure 2:
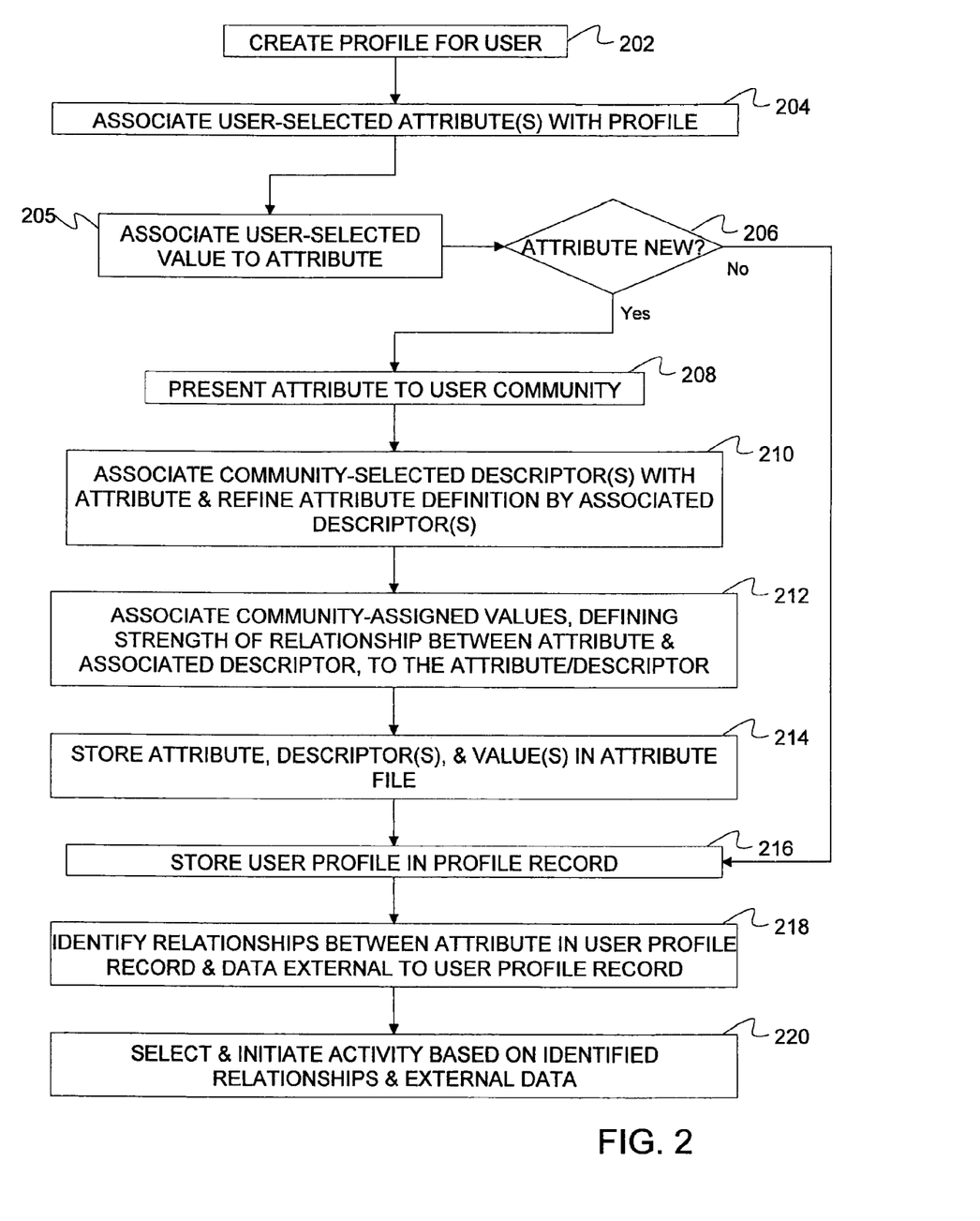
FIG. 2 illustrates a flow diagram describing a process for implementing the communication networking services in an exemplary embodiment.
Figure 3:
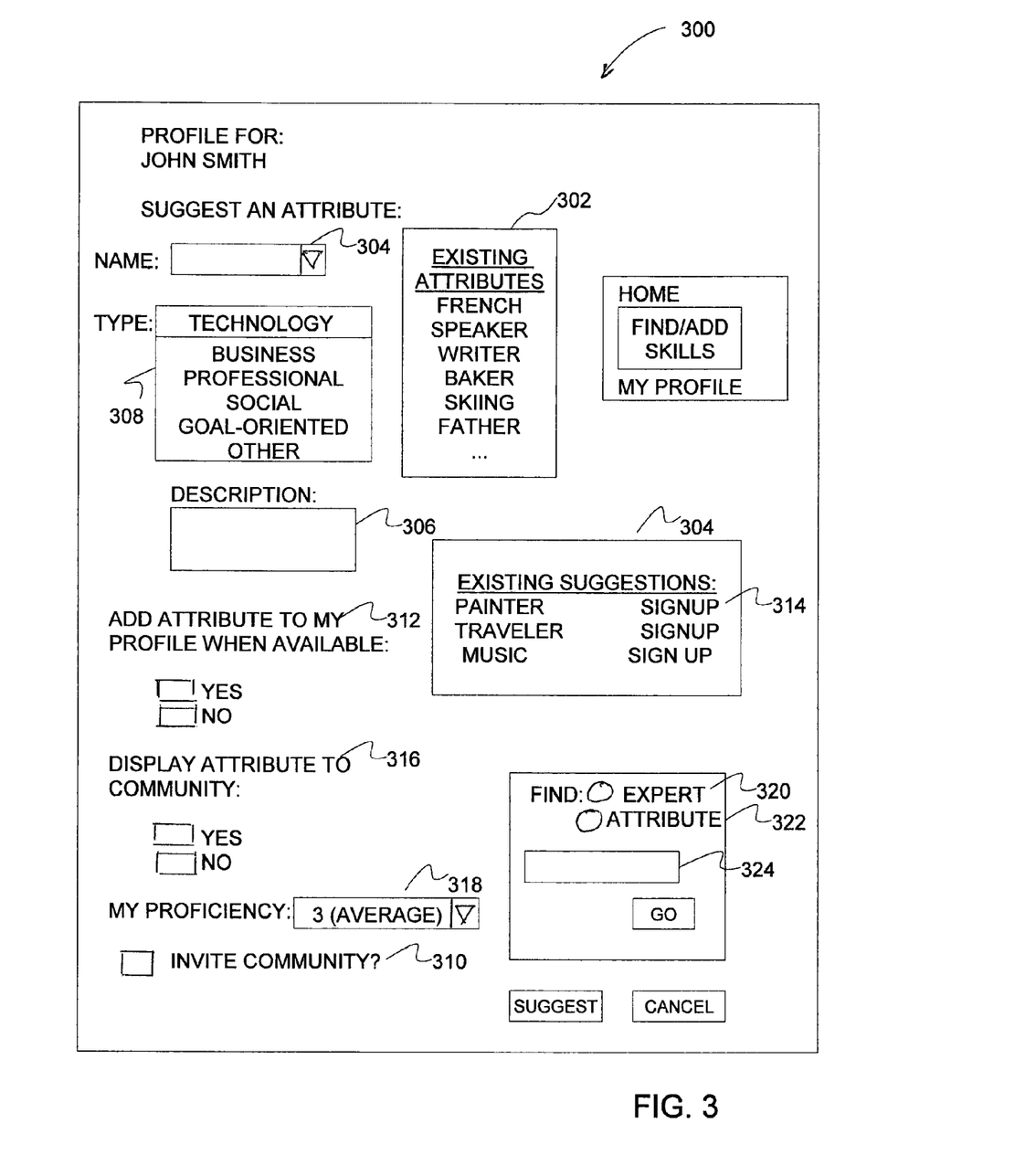
FIG. 3 depicts a user interface screen for creating and maintaining a user profile in an exemplary embodiment.

Turning now to FIG. 2, an exemplary process for implementing the communication networking services will now be described. The process described in FIG. 2 is primarily directed to creating a new profile, however other functionality with respect to the profile is shown and described in FIG. 3. A user at one of non-registered user systems 102D or 102E accesses the networking application 110 to create the profile and a user interface screen 300 is presented. At step 202, the user provides identifying information as part of the registration process, and which results in the creation of a member record. The user system (e.g., 102D) is provided with the user interface screen by the application 110 for entering information used to create the profile, as shown in FIG. 3.

At step 204, the user associates one or more attributes with the profile. The attributes can be pre-existing (e.g., from a list of attributes 302 previously defined by other community members when creating/updating their profiles), or may be generated by the user. If generated by the user, the user is prompted to enter a name for the attribute (via a "name" field 304) and a description of the attribute (via a "description" text box 306). Alternatively, or in addition thereto, the user may enter an attribute type in "type" field 308. As shown, e.g., in FIG. 3, the attributes may be classified according to whether they are directed to a technology, business/profession, social, and goal-oriented. It will be understood that other types may be added and utilized by the communication networking services. At step 205, the user associates a value to the attribute reflecting a level of proficiency or accuracy of the attribute as applied to the user. For example, if the attribute is "baker," the user may associate a maximum value to the attribute indicating that the user is highly proficient or expert with respect to "baking." Likewise, a low proficiency value may be assigned to the attribute, as the user perceives his/her skill level. This value is shown in FIG. 3 in "MY PROFICIENCY" field 318. At step 206, the application 110 determines whether the attribute provided by the user is new or pre-existing (e.g., by searching the profile attribute files in the storage device 108 for a match).

If the attribute is new, the attribute is presented to the community of users via the application 110 for review at step 208. This may be initiated when the user checks a box, "invite community" 310 via the user interface screen 300. The application 110 may be configured to approve the new attribute for acceptance in the attribute listing once one or more conditions have been met. For example, the attribute may be accepted when a minimum number of community users agree to attach or associate the suggested attribute with their profiles, indicating a need or desire for the new attribute. Additionally, the condition may be designed deny the addition of the new attribute after a specified time has elapsed where the minimum number of users have not agreed to the attribute. If the condition(s) are not met, then the attribute is simply void and will not appear in the profile of the user who suggested the attribute. Likewise, existing members of the community may use their profiles, e.g., via the user interface screen 300, to sign up to review pending attributes that have been suggested by other members. This may be performed by selecting a "sign up" option 314 adjacent to a corresponding attribute. In addition, the user of the profile created in FIG. 3 may be provided with an option to not only "suggest" a new attribute for inclusion in the attribute list 302, but may also request that the suggested attribute, once approved, be added to the user's profile (e.g., by selecting a corresponding option 312 via the user interface screen 300).

At step 210, the community of users further refines the attribute, via a function of the user interface (an example of which is shown in table 1 below), by associating descriptors that are related in some way to the attribute. For example, an attribute of "male" may include descriptors such as "father," "brother," "son," "husband," "spouse," and "man," to name a few. At step 212, each of the community of users, who have entered a descriptor, further assigns a value to each of the descriptors that reflect the strength of the relationship between the descriptor and the attribute. For example, "man" may be deemed to have a stronger relationship to "male" than would "spouse," since "spouse" can represent both male and female. The value assigned to the descriptor/attribute relationship may be based upon any configured method of qualifying a relationship. For example, a strongest relationship may be 5/5 (five points out of a total of five points) and a weakest relationship may be 1/5 (1 point out of a total of 5). A sample table reflecting inputs provided by the community of users is provided below.

TABLE 1

| USER | ATTRIBUTE | DESCRIPTOR | VALUE |
| --- | --- | --- | --- |
| A | MAN | MALE | 5/5 |
| B | MAN | MALE | 5/5 |
| C | MAN | MALE | 4/5 |
| ... | | | |
| A | MAN | FATHER | 3/5 |
| B | MAN | FATHER | 4/5 |
| ... | | | |

These values provided by the community of users may be aggregated and averaged to result in a single value that is assigned to the descriptor/attribute pair. This value may be used by the application 110 to process user profile information, as well as communications among the users, to identify relationships and take various actions based upon the relationships. By allowing the community of users to ascertain the descriptors and their relationship values to the attributes, the communication networking services enable the collective community of users to not only manage and control which attributes may be employed in implementing the user profiles, but also to manage and control the definitions of each of the attributes, which are used throughout the communication networking services. At step 214, the attribute provided by the user, the descriptors and associated values (or averaged value) are stored in an attribute file in storage device 108. Additionally, the user profile, including a user-provided value from step 205, is stored in a profile record in the storage device 108 at step 216.

At step 218, the application 110 identifies relationships between the attribute in the profile record and data external to the profile record. This step may be implemented at any time during the deployment of the communication networking services and is presented here for illustrative purposes. It will be understood that this step 218 may be continuously or periodically performed for one or more of the profile records on file in the storage device 108. The relationship identification process may be performed using various methods, such as via natural language processing techniques. The data external to the profile record may be any data obtained by the communication networking services. For example, the external data may be information obtained from another user's profile record, or may be gleaned from currently running or previously conducted communications between or among users (either registered or non-registered). In one example, a relationship may be identified by observing a communication in which a user "A" is discussing snow, skiing, and winter with another user "B". The application 110 may use these terms to search other communications and/or profile attribute records in storage device 108 to identify similar or matching terms that may be attributed to one or more attributes. The application 110 may then search various profile records and/or communications to identify users who have these attributes.

At step 220, the application 110 selects and initiates an activity based upon the identified relationships, as well as the nature of the external data. For example, using the above example, if the user "A" is a non-registered user (e.g., one of user systems 102D or 102E), the application 110 identifies one or more registered users having a profile that includes an attribute and/or descriptor that is similar or the same as one or more of these terms. Once found, the application 110 may prompt the registered user(s), or alternatively, prompt the user "B" to invite the user "A" to join the community. This reflects an assumption that the user "A" has common interests with at least one of the registered users of the community and may be a valuable addition to the community.

In another example, where both users are engaged in a communication, the activity initiated by the application 110 may include prompting the one of the users to evaluate the other user, e.g., via the user interface. In an exemplary embodiment, the evaluation provides an opportunity for users in the community to gather information concerning a particular member and qualify the member in terms of the member's attributes in the corresponding profile record. The evaluation may be conditional upon the member's (subject to the evaluation) consent. This may be implemented, e.g., by selecting the appropriate option for "DISPLAY ATTRIBUTE TO COMMUNITY?" 316, as shown in the user interface screen 300 of FIG. 3. The consent may include acquiescence by the subject member to allow the result of the evaluation to appear on the subject member's profile (not shown).

The evaluation process may be implemented in various ways. For example, the communication networking system may identify a proposed evaluating user for evaluating the accuracy of the value assigned by the member under evaluation (the value from step 205). In this embodiment, the system initiates the evaluation by determining that the proposed evaluating user knows the member and is a position to deliver a significant value to the member's expertise in his/her specific attribute under evaluation. Accordingly, the system may ask specific questions to the evaluating user in order to evaluate the member with respect to the attribute. The proposed evaluating user may be selected using a variety of criteria. For example, the system may identify one or more interactions previously conducted between the member under evaluation and the proposed evaluating user. In another example, the system may identify one or more common (and/or related) attributes shared by the evaluating user and the member under evaluation. In yet a further example, the system may identify one or more related terms in the communication between the proposed evaluating user and the member that are related to an attribute in the proposed evaluating user's profile, thereby suggesting that the proposed evaluating user is likely to be qualified for rendering the evaluation.

In an alternative embodiment, a user may initiate or volunteer to conduct the evaluation. For example, the evaluating user may initiate questions relating to the attribute to determine the accuracy of the value assigned by the member under evaluation. For example, suppose the attribute is "electrician." The evaluating member(s) may ask questions, such as "how long have you worked as an electrician," or "do you have an electrician license?" Other, more specific questions may be asked. The evaluating member(s) submit the results of the evaluation, which may, as described above, be implemented using a numerical scaling system (such as 1/5, 2/5, 3/5 ... etc.). The results may be aggregated and averaged, and the final value is displayed with the evaluated member's profile.

In a further embodiment, where two users are members of the community but have no previous knowledge of one another, the activity initiated by the application 110 may include prompting one or both of the users to initiate a communication with the other of the two. In this manner, the application 110 autonomously discovers users in the community who may have common interests and provides them an opportunity to meet and establish an ongoing relationship in the community.

Turning back to step 206, if the attribute is not generated by the user but is pre-existing in the communication networking system (e.g., previously defined by another community user and stored in an attribute record in storage device 108), the process then proceeds to step 216 as described above.

Other activities may include enabling registered members to search for other community members by various criteria. For example, a member may search for community members who have a defined attribute with a particular proficiency rating, i.e., defined as "expert" in their field. Searching for an expert indicates that the searcher seeks to discover individuals who have identified themselves with specific attributes and are recognized as experts in these attributes. For example, the searcher selects an "EXPERT" option 320 via the user interface screen 300 and types in the text box 324 "java, Spanish, golf" in order to find a Java programmer who speaks Spanish and plays golf. Additionally, a registered member may search for all community members with a rating of expert with respect to a particular attribute by selecting, e.g., an "ATTRIBUTE" option 322 within the user interface screen 300. The searcher may then enter terms, such as "law, patent, disclosure" in the text box 324 to find all attributes that are the same and which are also related to these concepts (e.g., "lawyer," "patent writer," "inventor"). In this manner, the search may yield experts who have identified themselves with the specific attributes, as well as related information.

These activities are a representative sampling of the various activities that may be provided by the communication networking services. The examples illustrated above are not to be construed as limiting in scope.

As described above, the communication networking services enable a community of users of the services to individually define themselves via self-selected attributes. The attributes' definitions are further refined by the collective community to better describe and clarify the meaning of the attributes, which provides consistency across the networking system. In addition, the individual members of the community qualify their own self-ascribed attributes with a value that reflects a proficiency level or accuracy of the attribute as applied to the corresponding member. The community of users are provided with the ability to further refine this value by gathering relevant information about the member, and adjusting the value commensurate with the results of the information, thereby enabling the collective community to control and manage the network and the information in the individual profiles. The system then works autonomously using the profiles and communications among the community to perform various functions in furtherance of the networking services.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the preferred embodiment to the invention has been described, it will be understood that those skilled in the art, both now and in the future, may make various improvements and enhancements which fall within the scope of the claims that follow. These claims should be construed to maintain the proper protection for the invention first described.

What is claimed is:

1. A method for implementing a community-defined and managed communication network among a community of users each operating a computer processor, and each computer processor in communication with a host system computer over the communication network, the method comprising:

receiving, via a user interface of a networking application executing on the host system computer, information for creating a profile for a user of a communication network, the information including at least one attribute selected from an attribute list and a request for adding a user generated attribute to the attribute list, the request including an authorization for receiving approval for the request from the community of users, the attributes representing at least one characteristic that describes the user;

creating, via the user interface, the profile that includes the user generated attribute and the at least one attribute selected by the user, the creating of the user-generated attribute responsive to the receiving of the approval for the request;

storing the profile in a profile record within a storage device communicatively coupled to the host system computer;

identifying, via the networking application, a relationship between the attribute in the profile record and data external to the profile record, the identification including analyzing user community-generated descriptors of the attribute and searching the external data for common descriptors; and initiating, via the networking application, an activity responsive to the analysis, the activity including at least one of:

prompting the user, via the user interface, to invite a second user who is not a registered member of the communication network to join the communication network, the external data including data from a communication between the user and the second user over the communication network;

prompting a third user, via the user interface, to evaluate the user with respect to the attribute, the external data including data from a communication between the user and the third user; and prompting the user, via the user interface, to initiate a communication with a fourth user who is a registered member of the communication network, the external data including at least one attribute or descriptor of the attribute in a profile record of the fourth user that is found in the profile record of the user.

2. The method of claim 1, wherein the third user is selected for performing the evaluation based upon at least one of:

identification of one or more interactions conducted between the user and the third user;

identification of one or more common attributes shared by the user and the third user;

identification of one or more related attributes of the user and the third user; and identification of one or more terms, in the communication between the user and the third user, that are related to an attribute in the third user's profile.

3. The method of claim 1, wherein the communication is a currently running messaging communication.

4. The method of claim 1, wherein the user generated attribute is created by the user and reviewed by the community of users, the method further comprising refining a definition of the user-generated attribute via the user community-generated descriptors.

5. The method of claim 4, further comprising: providing, by the user, a name and at least one of a description and attribute type of the user-generated attribute, the type comprising one of:

technology;
professional;
business;
social; and
goal-oriented.

6. The method of claim 1, wherein analyzing the user community-generated descriptors of the attribute and searching the external data for common descriptors are performed using natural language processing techniques.

7. The method of claim 1, further comprising: assigning a value to the attribute by the user, the user-assigned value indicative of a rating that, as perceived by the user, describes a proficiency or accuracy level of the attribute as applied to the user.

8. The method of claim 7, wherein prompting the third user to evaluate the user with respect to the attribute comprises: refining the value assigned by the user based upon observations made by the third user with respect to activities conducted by the user over the communication network.

9. A system for implementing a community-defined and managed communication network among a community of users each operating a computer processor, and each computer processor in communication with a host system computer over the communication network, the method comprising:
a host system computer in communication with the computer processors; and
a networking application including a user interface executing on the host system computer, the networking application performing a method, the method comprising:
receiving, via the user interface, information for creating a profile for a user of the communication network, the information including at least one attribute selected from an attribute list and a request for adding a user generated attribute to the attribute list, the request including an authorization for receiving approval for the request from the community of users, the attributes representing at least one characteristic that describes the user;
creating, via the user interface, the profile that includes the user generated attribute and the at least one attribute selected by the user, the creating of the user generated attribute responsive to the receiving of the approval for the request;
storing the profile in a profile record within a storage device communicatively coupled to the host system computer;
identifying a relationship between the attribute in the profile record and data external to the profile record, the identification including analyzing user community-generated descriptors of the attribute and searching the external data for common descriptors; and
initiating an activity responsive to the analysis, the activity including at least one of:
prompting the user, via the user interface, to invite a second user who is not a registered member of the communication network to join the communication network, the external data including data from a communication between the user and the second user over the communication network;
prompting a third user, via the user interface, to evaluate the user with respect to the attribute, the external data including data from a communication between the user and the third user; and
prompting the user, via the user interface, to initiate a communication with a fourth user who is a registered member of the communication network, the external data including at least one attribute or descriptor of the attribute in a profile record of the fourth user that is found in the profile record of the user.

10. The system of claim 9, wherein the third user is selected for performing the evaluation based upon at least one of:
identification of one or more interactions conducted between the user and the third user;
identification of one or more common attributes shared by the user and the third user;
identification of one or more related attributes of the user and the third user; and
identification of one or more terms, in the communication between the user and the third user, that are related to an attribute in the third user's profile.

11. The system of claim 9, wherein the communication is a currently running messaging communication.

12. The system of claim 9, wherein the user generated attribute is created by the user and reviewed by the community of users, the method further comprising refining a definition of the user-generated attribute via the user community-generated descriptors.

13. The system of claim 12, wherein the networking application further performs: receiving, from the user, a name and at least one of a description and attribute type of the user-generated attribute, the type comprising one of:
technology;
professional;
business;
social; and
goal-oriented.

14. The system of claim 9, wherein analyzing the user community-generated descriptors of the attribute and searching the external data for common descriptors are performed using natural language processing techniques.

15. The system of claim 9, wherein the networking application further performs: assigning a value to the attribute received by the user, the user-assigned value indicative of a rating that, as perceived by the user, describes a proficiency or accuracy level of the attribute as applied to the user.

16. The system of claim 15, wherein prompting the third user to evaluate the user with respect to the attribute comprises: refining the value assigned by the user based upon observations made by the third user with respect to activities conducted by the user over the communication network.

17. A computer program product comprising a computer-readable storage medium for implementing a community-defined and managed communication network among a community of users each operating a computer processor, and each computer processor in communication with a host system computer over the communication network, the computer-readable storage medium including instructions for causing the host system computer to implement a method, the method comprising:
receiving information for creating a profile for a user of the communication network, the information including at least one attribute selected from an attribute list and a request for adding a user generated attribute to the attribute list, the request including an authorization for receiving approval for the request from a predetermined number of the community of users, the attributes representing at least one characteristic that describes the user;
creating the profile for the user that includes the user generated attribute and the at least one attribute selected by the user, the creating of the user generated attribute responsive to the receiving of the approval for the request;
storing the profile in a profile record within a storage device communicatively coupled to the host system computer;
identifying a relationship between the attribute in the profile record and data external to the profile record, the identification including analyzing user community-generated descriptors of the attribute and searching the external data for common descriptors; and
initiating an activity responsive to the analysis, the activity including at least one of:
prompting the user to invite a second user who is not a registered member of the communication network to join the communication network, the external data including data from a communication between the user and the second user over the communication network;

prompting a third user to evaluate the user with respect to the attribute, the external data including data from a communication between the user and the third user; and prompting the user to initiate a communication with a fourth user who is a registered member of the communication network, the external data including at least one attribute or descriptor of the attribute in a profile record of the fourth user that is found in the profile record of the user.

18. The computer program product of claim 17, wherein the third user is selected for performing the evaluation based upon at least one of:
- identification of one or more interactions conducted between the user and the third user;
- identification of one or more common attributes shared by the user and the third user;
- identification of one or more related attributes of the user and the third user; and
- identification of one or more terms, in the communication between the user and the third user, that are related to an attribute in the third user's profile.

19. The computer program product of claim 17, wherein the communication is a currently running messaging communication.

20. The computer program product of claim 17, wherein the user generated attribute is created by the user and reviewed by the community of users, the method further comprising refining a definition of the user-generated attribute via the user community-generated descriptors.

21. The computer program product of claim 20, further comprising instructions for implementing: receiving, from the user, a name and at least one of a description and attribute type of the user-generated attribute, the type comprising one of:
- technology;
- professional;
- business;
- social; and
- goal-oriented.

22. The computer program product of claim 17, wherein analyzing the user community-generated descriptors of the attribute and searching the external data for common descriptors are performed using natural language processing techniques.

23. The computer program product of claim 17, further comprising instructions for implementing: assigning a value to the attribute by the user, the user-assigned value indicative of a rating that, as perceived by the user, describes a proficiency or accuracy level of the attribute as applied to the user.

24. The computer program product of claim 23, wherein prompting the third user to evaluate the user with respect to the attribute comprises: refining the value assigned by the user based upon observations made by the third user with respect to activities conducted by the user over the communication network.

* * * * *